United States Patent [19]

Burianek et al.

[11] 4,298,889
[45] Nov. 3, 1981

[54] SYNCHRONIZATION CIRCUIT FOR VIDEO CLOCK OSCILLATORS

[75] Inventors: Rudolf Burianek; Gottfried Tschannen, both of Zürich, Switzerland

[73] Assignee: Siemenas-Albis AG, Zürich, Switzerland

[21] Appl. No.: 127,454

[22] Filed: Mar. 5, 1980

[30] Foreign Application Priority Data

Mar. 16, 1979 [CH] Switzerland ............... 2498/79

[51] Int. Cl.³ .............................................. H04N 5/04
[52] U.S. Cl. ..................................... 358/148; 358/149
[58] Field of Search ............... 358/148, 149, 150, 151, 358/152, 153, 154, 210

[56] References Cited

U.S. PATENT DOCUMENTS

| | | | |
|---|---|---|---|
| 3,424,866 | 1/1969 | Hathaway | 358/149 |
| 3,567,861 | 3/1971 | Webb | 358/149 |
| 3,816,658 | 6/1974 | Vidovic | 358/149 |
| 4,169,659 | 10/1979 | Marlowe | 358/150 |
| 4,214,261 | 7/1980 | Bazin | 358/149 |
| 4,220,968 | 9/1980 | Scholz | 358/148 |

*Primary Examiner*—Michael A. Masinick
*Attorney, Agent, or Firm*—Werner W. Kleeman

[57] ABSTRACT

A synchronization circuit for video clock generators, wherein in order to obtain a line synchronization simultaneous with a complete image synchronization, there is provided a follow-up control which delivers a clock frequency signal. The follow-up control has its reference input connected with the output of a line pulse-separation circuit, delivering an external horizontal pulse signal, and is further connected with the input of an external complete image characteristic or marker pulse-separation circuit. Both of the separation circuits have infed at their input side a mixed pulse signal. The external complete image-characteristic pulse-separation circuit is connected at its output side with the first input of a comparator, the second input of which has infed thereto the output signal of an internal complete image characteristic pulse-separation circuit. The output signal of the comparator is infed to the first input of a regulation pulse-switch means, whose output is connected with the clock input of a clock generator, delivering to a respective output an internal mixed pulse signal and an internal horizontal pulse signal. The latter is delivered to the comparator input of the follow-up control and the first input of the internal complete image-characteristic pulse-separation circuit, the second input of which receives the internal mixed pulse signal. The output of the follow-up control is connected with the second input of the regulation pulse switch means.

10 Claims, 5 Drawing Figures

SYNCHRONIZATION CIRCUIT FOR VIDEO CLOCK OSCILLATORS

BACKGROUND OF THE INVENTION

The present invention relates to a new and improved construction of synchronization circuit for video clock oscillators.

In order to superimpose video images upon a screen it is necessary that the video signals, arriving from different video camera devices, be mutually synchronized. For this purpose all of the video cameras can be conjointly synchronized with the aid of the synchronization signals from one and the same synchronization clock source, which delivers a mixed pulse signal or a horizontal pulse signal in conjunction with a vertical pulse signal.

This simple method of synchronization of video images has however been found to be impractical, if there is not used a video camera which is not externally synchronized or if the synchronization problem resides in synchronizing video images corresponding to two or more different standards.

SUMMARY OF THE INVENTION

Therefore, with the foregoing in mind, it is a primary object of the present invention to provide a new and improved construction of synchronization circuit enabling synchronization of a number of video cameras or the like with a different non-externally synchronized video camera, and the video images can correspond to different standards.

Now in order to implement these and still further objects of the invention, the synchronization circuit for video clock generators is manifested by the features that in order to obtain a line synchronization simultaneous with a complete image synchronization, there is provided a follow-up control which delivers a clock frequency signal. The follow-up control has its reference input connected with the output of a line pulse-separation circuit, delivering an external horizontal pulse signal, and is further connected with the input of an external complete image-characteristic or marker pulse-separation circuit. Both of the separation circuits have infed at their input side a mixed pulse signal. The external complete image-characteristic pulse-separation circuit is connected at its output side with the first input of a comparator, the second input of which has infed thereto the output signal of an internal complete image-characteristic pulse-separation circuit. The output signal of the comparator is infed to the first input of a regulation pulse-switch means, whose output is connected with the clock input of a clock generator, delivering to a respective output an internal mixed pulse signal and an internal horizontal pulse signal. The latter is delivered to the comparator input of the follow-up control and the first input of the internal complete image-characteristic pulse-separation circuit, the second input of which receives the internal mixed pulse signal. The output of the follow-up control is connected with the second input of the regulation pulse switch means.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
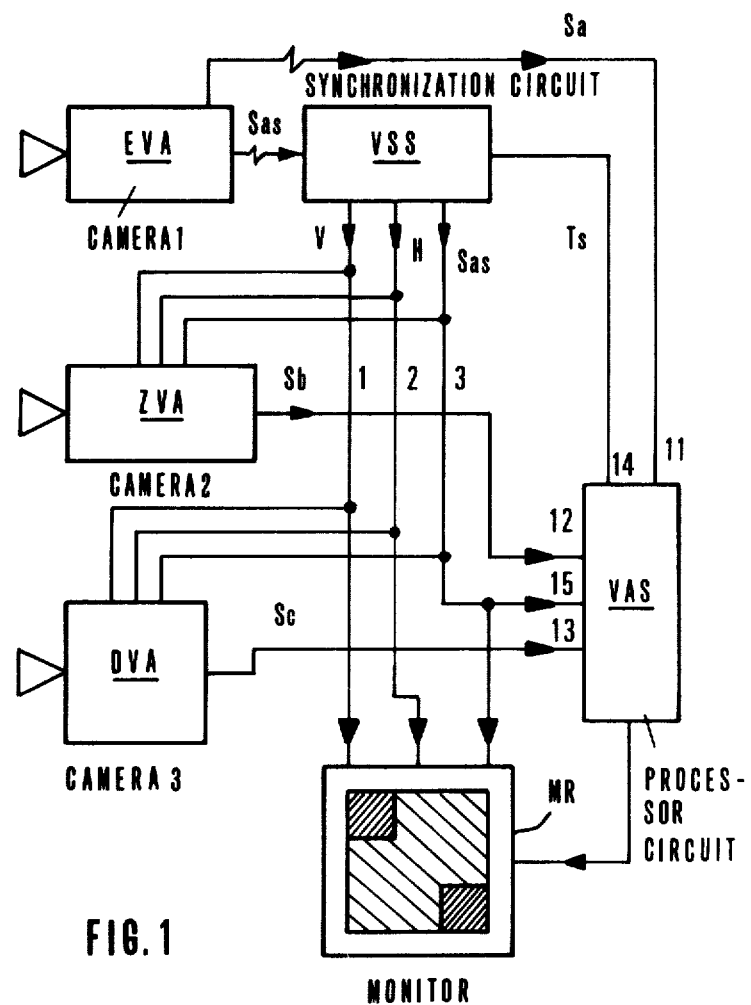
FIG. 1 is a block circuit diagram illustrating the principal construction of an apparatus according to the invention.

Describing now the drawings, the apparatus shown by way of example in FIG. 1 will be seen to comprise a synchronization circuit VSS which is connected at its input side with a non-external synchronized first video camera EVA or the like. The output side of the synchronization circuit VSS is conjointly connected by means of three lines or conductors 1, 2, and 3, firstly, with a second video camera ZVA, and furthermore with a third video camera DVA, and finally, with a video playback device or monitor MR. The three lines 1, 2, 3 are provided for a vertical pulse signal V, for a horizontal pulse signal H=H1, H2 and for a mixed pulse signal Sas, respectively, and all three signals are mutually synchronized. The apparatus of FIG. 1 additionally contains a processor or processing circuit VAS, whose three first inputs 11, 12, 13 are each impinged with a respective video output signal Sa, Sb, Sc of the video cameras EVA, ZVA and DVA respectively, and whose fourth input 14, receiving a clock frequency signal Ts, is connected with a further output of the synchronization circuit VSS.

The processing circuit VAS additionally contains a fifth input 15, which receives the mixed pulse signal Sas of the first video camera EVA which is infed by means of the synchronization circuit VSS. The video monitor MR is connected by means of a number of lines with the processor circuit VAS.

Figure 2:
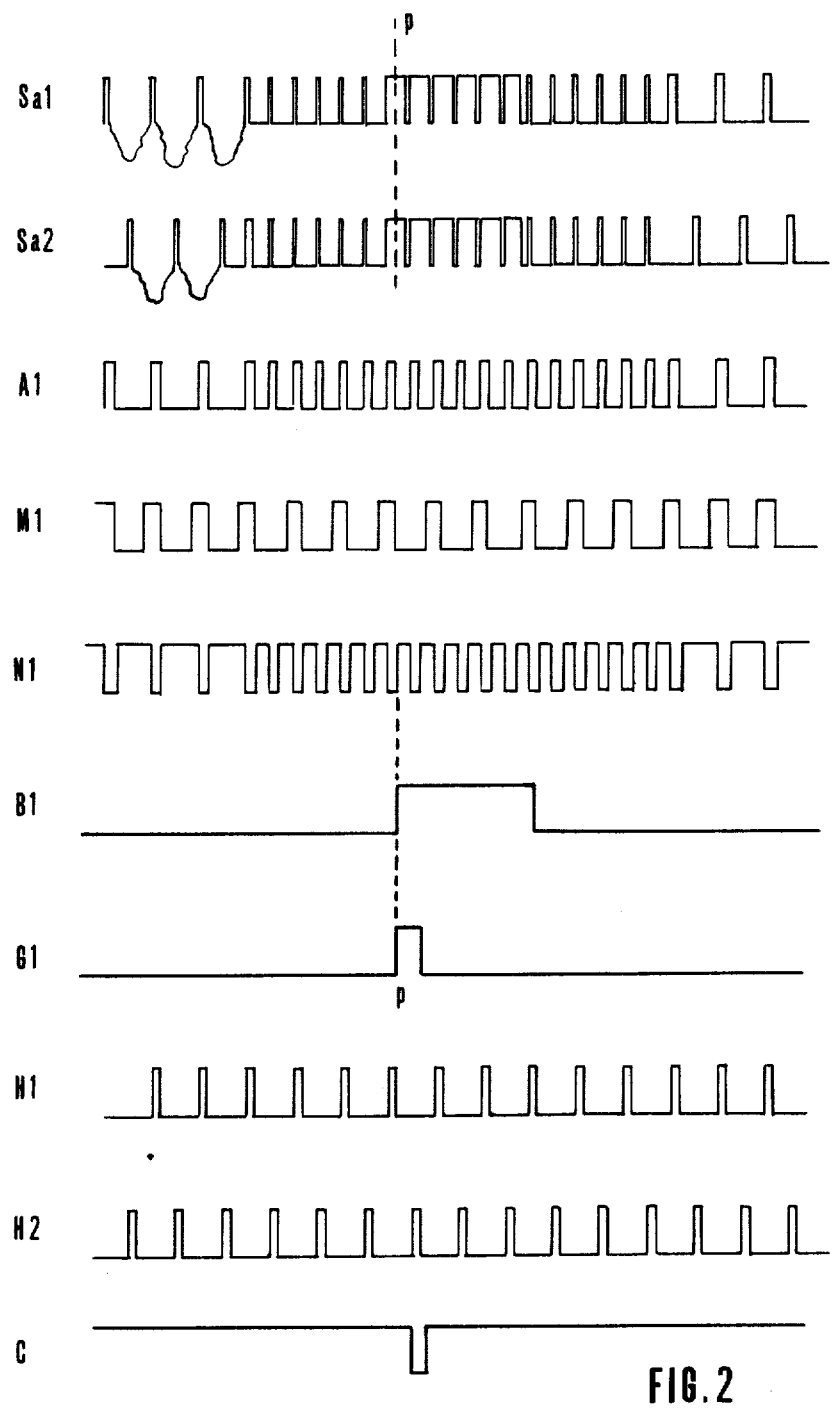
FIG. 2 is a time diagram illustrating different signals.

The input signal Sas of the synchronization circuit VSS is constituted by a standard mixed pulse signal, for instance according to CCIR-standard, as the same has been illustrated in FIG. 2 with two sequentional signal portions Sa1 for the even lines and Sa2 for the uneven lines. Thus Sas=Sa1, Sa2. As to such mixed pulse signals, the same has been discussed in detail, for instance, in the textbook: "Hütte IV B, Elektrotechnik, Teil B, Fernmeldetechnik", W. Ernst & Sons, Berlin, 1962, Page 1122.

The video signal Sa comprises an image signal and a mixed pulse signal Sas, composed of blanking pulses and synchronization pulses. In FIG. 2 the image signal is portrayed as irregular curved envelopes or courses at the lower region of the curves Sa1 and Sa2, respectively.

According to FIG. 1, both the video cameras ZVA and DVA and equally the video playback devices or monitors are connected with the lines or conductors 1, 2, 3. However, for synchronization there is only required either the mixed pulse signal Sas or the horizontal pulse signal H together with the vertical pulse signal V.

In the synchronization circuit VSS there is produced from the mixed pulse signal Sas a clock frequency signal Ts. With the aid of the mixed pulse signal Sas and possibly the clock frequency signal Ts the video signal Sb of the second video camera ZVA and the video signal Sc of the third video camera DVA are synchronized. The synchronized video signals Sa, Sb and Sc coming from the three video cameras EVA, ZVA, DVA then can be processed in the processing circuit VAS such that there is now possible a superimposed representation of the images at the screen of the monitor MR. At the processing circuit VAS there also can occur a standard transformation.

Figure 3:
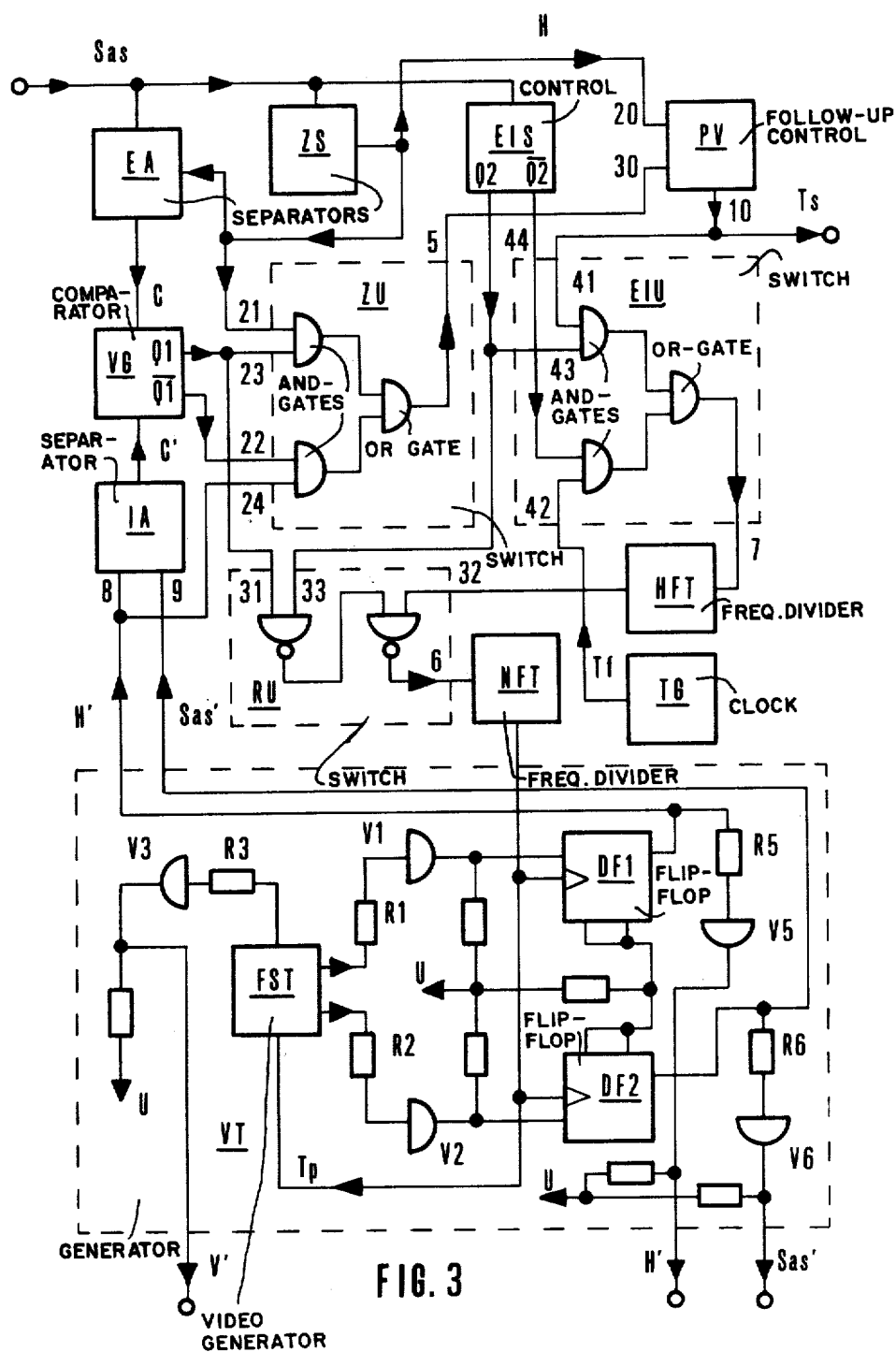
FIG. 3 is a circuit diagram showing an example of an inventive synchronization circuit.

The synchronization circuit VSS of FIG. 3 comprises a follow-up control PV which outfeeds the clock frequency signal Ts, and the reference input 20 of which is connected with the output of a line pulse-separation circuit ZS, with the input of an external complete image-characteristic pulse-separator circuit EA and with the first input 21 of a line pulse-switch means ZU, and whose comparison input 30 is connected with the output 5 of such line pulse-switch means ZU. Both of the separator or separation circuits ZS and EA receive at the input side the mixed pulse signal Sas.

The external complete image-characteristic pulse-separator circuit EA is connected at its output side with the input of a comparator VG. The inverted output signal Q1 of the comparator VG is infed to the second input 22 and its non-inverted output signal Q1 is infed to the third input 23 of the line pulse-switch means ZU, and its second input receives the output signal C' of an internal complete image-characteristic pulse-separator circuit IA. The non-inverted output signal Q1 of the comparator VG is additionally infed to the first input 31 of a regulation pulse-switch means RU, whose output 6 is connected, by means of a low-frequency divider NFT with the clock input of a video clock generator VT. The video clock generator VT delivers by means of three different outputs a mixed pulse signal Sas', a horizontal pulse signal H'=H1', H2' and a vertical pulse signal V'. This horizontal pulse signal H' is infed to the fourth input 24 of the line pulse-switch means ZU and the first input 8 of the internal complete image-characteristic pulse-separator circuit IA whose second input 9 receives the signal Sas'.

The output 10 of the follow-up control PV is connected with the first input 41 of an external-internal switch or reversing switch means EIU whose second input 42 receives the output signal Tf of a clock source TG and whose output 7 is connected by means of a high-frequency divider HFT with the second input 32 of the regulation pulse-switch means RU. The third input 33 of the switch means RU receives the non-inverted output signal Q2 of an external-internal control EIS and is connected with the third input 43 of the external-internal switch means EIU, whose fourth input 44 has infed thereto the inverted output signal Q2 of this external-internal control or control means EIS, which receives at its input side the mixed pulse signal Sas.

The reversing switch means or switches ZU and EIU are similarly constructed and each contain two AND-gates whose outputs are grouped together by means of a respective OR-gate, wherein the first input 21 and the third input 23 of the switch means ZU constitute the two inputs of one of such AND-gates and the first input 41 and the third input 43 of the switch means EIU constitutes the two inputs of another of such AND-gates.

With the switch means or the switches ZU and EIU either the input 21 or 41, as the case may be, is open and the input 24 or 42, as the case may be, is closed, or vice versa so that either the signal H1, H2 or the signal H1', H2' can pass, via the switch ZU and either the signal Ts or the signal Tf can pass, via the switch EIU, to the output of the switch means.

The first and third inputs 31 and 33 of the regulation pulse-switch means RU constitute the inputs of a first NAND-gate whose output is connected with an input of a second NAND-gate, whose other input constitutes the second input 32 and whose output constitutes the output 6 of the regulation pulse-switch means RU.

The regulation pulse-switch means RU blocks the signal flow from the high-frequency divider HFT to the low-frequency divider NFT then, and only then, when the line-pulse switch means ZU conducts the signal H1, H2 and the external-internal-switch means EIU the signal Ts.

The video clock generator VT comprises a TV-clock generator FST, whose horizontal pulse signal output is connected by means of the series circuit of a first resistor R1 and a first amplifier V1 with the D-input of a first D-flipflop DF1 and whose mixed pulse signal output is connected by means of the series circuit of a second resistor or resistance R2 and a second amplifier V2 with the D-input of a second D-flipflop DF2. The vertical pulse signal output of the TV-clock generator FST is connected by means of a third resistance R3 with the input of a third amplifier V3 whose output constitutes the output of the video clock generator VT.

The synchronization circuit VSS of FIG. 3 functions in the following manner:

At the line pulse-separator circuit circuit ZS there are obtained the line pulse signals H1 and H2 according to FIG. 2, and the line pulse signal H1 is valid for the even lines and the line pulse signal H2 for the uneven lines.

In the external complete image-characteristic pulse-separator circuit EA there is derived from the relevant first image synchronization pulse an external complete image-characterization pulse C, according to FIG. 2, which is delayed in relation to the image synchronization pulse.

The video clock generator VT produces a mixed pulse signal Sas' which is identical with the mixed pulse signal Sas appearing at the input of the synchronization circuit VSS and a horizontal pulse signal H'=H1', H2' which is identical with the horizontal pulse signal H=H1, H2 at the output of the line pulse separator circuit ZS. During placement into operation of the equipment in the non-synchronized state, the signals Sas' and Sas on the one hand and the signals H' and H on the other hand, are shifted in time.

The internal complete image-characteristic pulse-separator circuit IA is constructed the same as the external complete image-characteristic pulse-separator circuit EA. Its output signal C' is identical with the output signal C of the separator circuit EA, however is shifted in time in relation thereto in the non-synchronized state.

The comparator VG is a D-flipflop, whose D-input is continuously infed with a logic "1" signal, and whose clock signal input receives the output signal C' of the separator circuit IA and whose resetting input receives the output signal C of the separator circuit EA. As long as no external complete image characteristic or marker pulse C (FIG. 2) arrives, then Q1=1.

Upon the presence of the mixed pulse signal Sas, the output signal Q2 of the external-internal control EIS is a logic "1" signal, and therefore Q2=1. In the non-synchronized state, the output signal Q1 of the comparator VG is a logic "1" signal, and thus Q1=1. With Q1=1 and Q2=1 the signal H is infed, on the one hand, from the input 21 via the output 5 of the reversing switch or switch means ZU to the input 30 of the follow-up control PV and, on the other hand, directly to the input 20 of the follow-up control PV. The follow-up control PV delivers a clock frequency signal Ts, which arrives at the input of the switch or switch means RU by means of the reversing switch EIU and the high-frequency divider HFT, the switch RU is however blocked. Each time, however, when an external complete image-characteristic pulse C (FIG. 2) appears for instance with the frequency of 25 Hz at the resetting input of the D-flipflop VG, the switch RU is opened by virtue of the signal Q1=0 appearing at the output of the D-flipflop VG, the video clock generator VT is placed into operation and the signal H' is infed by means of the input 24 of the reversing switch ZU to the input 30 of the follow-up control PV, which compares and synchronizes the signals H and H'.

Once there has been attained the synchronization state, then there is present a coincidence between both of the complete image-characteristic or marker pulses C and C' of the comparator VG, which in turn has the result that Q1=0 and thus, the synchronization state is maintained.

By virtue of the circuit configuration there is thus obtained at the same time a line synchronization by means of the follow-up control PV and a complete image synchronization by means of the comparator VG.

The reversing switch or switch means ZU can be structured such that the terminal 23 of the first NAND-gate is connected by means of an inverter, not particularly shown in FIG. 3, with the terminal 22 of the second NAND-gate. In one such case, the terminal 23 of the first NAND-gate would constitute the single control input of the line pulse-reversing switch ZU. The same is analogously true for the external-internal reversing switch EIU.

Figure 4:
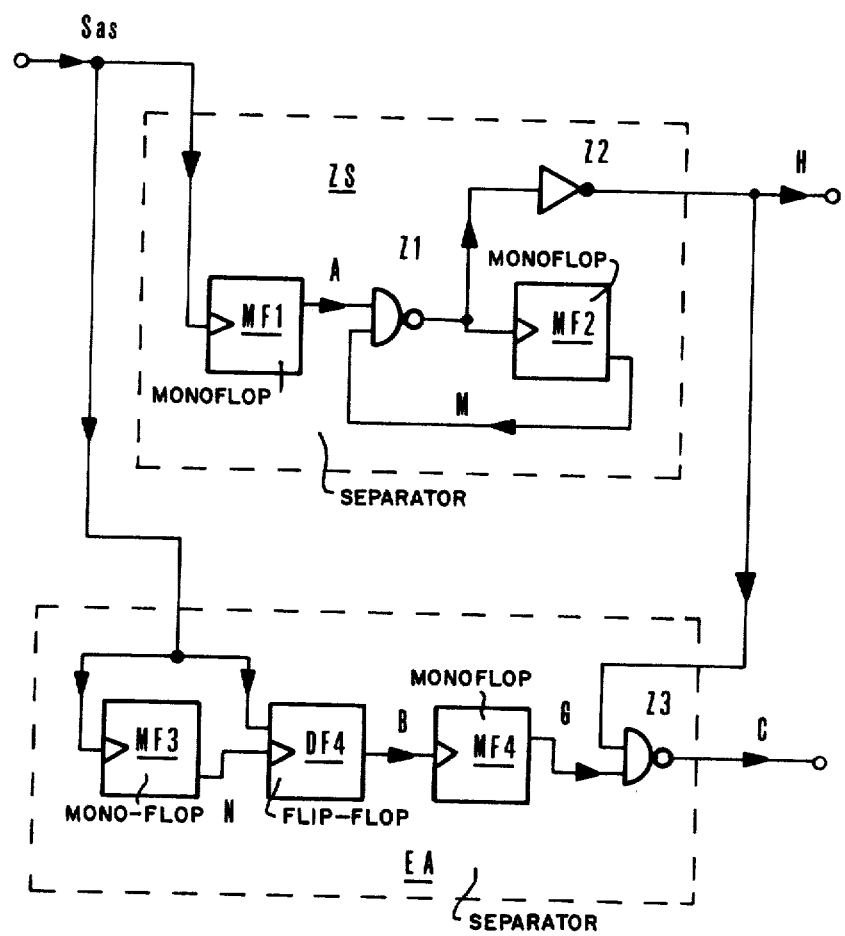
FIG. 4 is a diagram showing an example of a line pulse-separation circuit and an external image characteristic pulse-separation circuit for such synchronization circuit.

The line pulse-separation circuit ZS, shown in FIG. 4, comprises a first monostable multivibrator or monoflop MF1, whose clock input receives the mixed pulse signal Sas=Sa1, Sa2 and whose output signal A=A1, A2 is delivered to the first input of a NAND-gate or element Z1. The output of the NAND-gate Z1 is connected, on the one hand, with the input of an inverter Z2 and, on the other hand, with the clock input of a second monostable multivibrator or monoflop MF2, the inverted output signal M=M1, M2 is infed to the second input of the NAND-gate Z1. The output of the inverter Z2 delivers the signal H=H1, H2.

The signals Sa1, A1, M1 and H1 correspond to the first half image and have been illustrated in FIG. 2. The signals Sa2, A2, M2, and H2 correspond to the second half image. The signals A2 and M2 have not been shown in FIG. 2, but however can be correspondingly derived from the mixed pulse signal Sa2 (FIG. 2).

The signal A1 consists of pulses having a pulse width of for instance 8 μs, corresponding to the time-constant of the first monoflop stage MF1. The signal M1 consists of pulses having a pulse pause interval or width of approximately T=48 μs which corresponds to the time constant of the second monostable multivibrator or monoflop MF2. The signal H1 consists of pulses which are repetitive at a cycle having the duration t. Thus there is valid the relationship $$t/2 < T < t.$$

The external complete image-characteristic pulse-separation circuit EA shown in FIG. 4, comprises a first monostable multivibrator or monoflop MF3 to which there is infed by means of a clock input the mixed pulse signal Sas=Sa1, Sa2 and a second monoflop MF4 receiving, by means of a clock input the output pulse signal B=B1, B2 or a D-flipflop DF4. The D-flipflop DF4 has infed by means of its D-input the mixed pulse signals Sas and by means of its clock input the inverted output pulse signal N of the monostable multivibrator or monoflop MF3. The separation circuit EA additionally contains a NAND-gate or element Z3 whose first input has infed thereto the pulse signal H=H1, H2 and whose second input has infed thereto the output pulse signal G of the monoflop MF4, and whose output pulse signal constitutes the external complete image-characteristic-pulse C.

The signals N1, B1 and G1 correspond to the first half image and have been portrayed in FIG. 2.

The signal N1 consists of pulses of different width, between which pulses there are pulse pauses or intervals amounting to approximately at least 15 μs; the duration of the pulse pause intervals corresponds to the time constant of the monostable multivibrator or monoflop MF3. Upon arrival of the first wide image synchronization pulse at the D-input of the D-flipflop DF4 together with a pulse N1 at the clock input of the D-flipflop DF4 at the moment p such flips over and delivers an output pulse signal B1=1. This state lasts for such a length of time until the wide image synchronization pulses have disappeared. The monostable multivibrator or monoflop MF4 attenuates the thus obtained pulse G1 to a width of at least approximately 32 μs, corresponding to its time-constant. From the pulse signals H and G, there is now sampled for each complete image a characteristic or marker pulse C with the aid of the NAND-gate Z3, which then is processed in the comparator VG.

Figure 5:
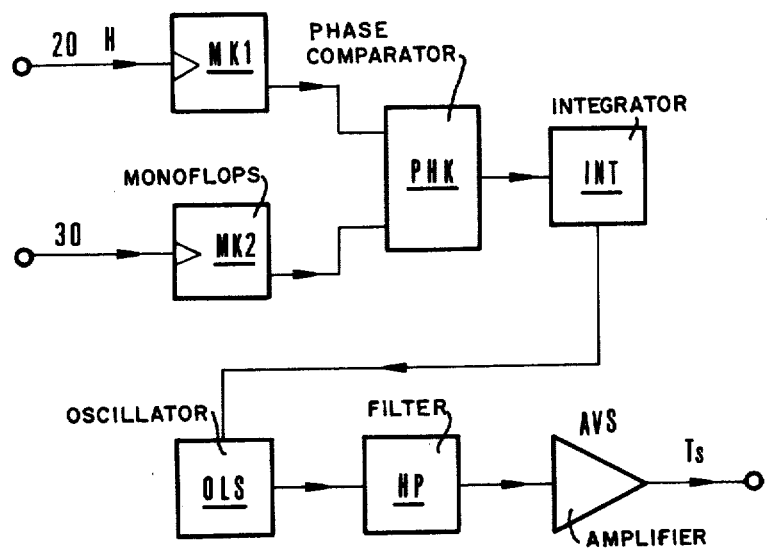
FIG. 5 is a circuit diagram of a possible construction of a follow-up control for the synchronization circuit.

The follow-up control PV of FIG. 5 contains a phase comparator PHK, whose first input is connected with the inverting output of a first monostable multivibrator or monoflop MK1 which receives at its input side the signal H and whose second input is connected with the inverting output of a second monoflop MK2. The second monoflop MK2 receives at its input side the signal H' or, when the complete image synchronism has not yet been obtained, is impinged by the signal H itself.

The output of the phase comparitor PHK is connected by means of the series circuit of an integrator INT, an oscillator circuit OLS and a high-pass filter HP with the input of an output-amplifier circuit AVS. There can also be used a high-pass filter a capacitor. Between the output of the integrator INT and the reference potential there can be incorporated a Zener diode.

At the monostable multivibrators or monoflops MK1 and MK2 there is enlarged the width of the pulses H and H' respectively, in order to obtain at least approximately a pulse sampling ratio of 1:1.

For the synchronization of a TV-image the leading synchronization pulse flanks are decisive. Since the phase comparator PHK accomplishes the pulse comparison with the trailing pulse flanks or edges, there are simultaneously inverted the enlarged pulses in the monoflops MK1 and MK2. The phase comparator PHK delivers to the integrator INT the fault or error voltage which is derived from the phase comparison. The oscillator circuit OLS contains a voltage-dependent oscillator and a varactor diode, which are not illustrated in FIG. 5. Yet, such circuitry is known for instance, from the data sheets (1972) MC 1648 of Motorola Corporation. The output signal Ts of the output amplifier circuit AVS must have a relatively high frequency, if it should serve for the synchronization of video clock oscillators, corresponding to different standards. In this case it is necessary to provide in the synchronization circuit VSS at least one clock divider HFT or NFT (FIG. 3).

When the output signal Q1 of the comparator VG constitutes a logic "1" signal, then at the inputs 20 and 30 of the follow-up control PV there is compared with itself the signal H. In this way there is obtained the result that the voltage-dependent oscillator, contained in the follow-up control PV, cannot deviate very much from the reference frequency, so that upon closing the regulation loop (phase-locked-loop) latching into the reference frequency becomes unproblematic. The same effect can be obtained with the aid of a holding circuit in the follow-up control PV. In that instance, the reversing switch ZU would not be necessary, since the input 8 of the internal complete image-characteristic-pulse-separator circuit IA would be directly connected with the input 30 of the follow-up control PV.

While there are shown and described present preferred embodiments of the invention, it is to be distinctly understood that the invention is not limited thereto, but may be otherwise variously embodied and practiced within the scope of the following claims. Accordingly,

What I claim is:

1. A synchronization circuit for video clock generators, in order to obtain a line synchronization simultaneous with a complete image synchronization, comprising:
    a follow-up control having an output and delivering a clock frequency signal;
    said follow-up control having a reference input and a comparison input;
    a line pulse separation circuit having an output delivering an external horizontal pulse signal;
    said follow-up control having said reference input connected with said output of the line pulse-separation circuit which delivers said external horizontal pulse signal;
    an external complete image-characteristic pulse-separation circuit having an input and an output;
    the reference input of the follow-up control being connected with the input of the external complete image-characteristic pulse-separation circuit;
    both of the separation circuits being impinged at their input sides with a mixed pulse signal;
    a comparator having a first input and a second input and delivering an output signal;
    the external complete image-characteristic pulse-separation circuit being connected at its output with the first input of the comparator;
    an internal complete image-characteristic pulse-separation circuit having a first input and a second input and delivering an output signal;
    the second input of the comparator receiving the output signal of the internal complete image-characteristic pulse-separation circuit;
    a regulation pulse-switch means having a first input and a second input;
    the output signal of the comparator being infed to the first input of the regulation pulse-switch means;
    said regulation pulse-switch means having an output;
    a video clock generator having a clock input;
    the output of the regulation pulse-switch means being connected with the clock input of said video clock generator;
    said video clock generator having respective outputs delivering respectively an internal mixed pulse signal and an internal horizontal pulse signal;
    said internal horizontal pulse signal being infed to the comparison input of the follow-up control and the first input of the internal complete image-characteristic pulse-separation circuit;
    said internal complete image-characteristic pulse-separation circuit receiving at its second input the internal mixed pulse signal; and
    said follow-up control having its output connected with the second input of the regulation pulse-switch means.

2. The synchronization circuit as defined in claim 1, further including:
    an external-internal switch means for connecting the follow-up control with the second input of the regulation pulse-switch means such that the output of the follow-up control is connected with a first input of the external-internal switch means;
    a clock pulse source delivering an output signal;
    said external-internal switch means having a second input which receives the output signal of said clock pulse source;
    an external-internal control means having an output;
    said regulation pulse-switch means having a third input which is connected with a control input of the external-internal switch means and with the output of said external-internal control means which detects the presence of a mixed pulse signal at the input of the synchronization circuit.

3. The synchronization circuit as defined in claim 2, further including:
    at least one clock divider incorporated between the output of the external-internal switch means and the input of the video clock generator.

4. The synchronization circuit as defined in claim 3, wherein:
    the video clock generator comprises a TV clock generator having a horizontal pulse signal output and a mixed pulse signal output;
    a first D-flipflop having a D-input;
    a second D-flipflop having a D-input; and
    the horizontal pulse signal output of the TV-clock generator being connected with the D-input of the first D-flipflop and the mixed pulse signal output being connected with the D-input of the second D-flipflop.

5. The synchronization circuit as defined in claim 4, further including:
    a line pulse-reversing switch means having a first input and a second input;
    the external horizontal pulse signal being infed to the first input of said line pulse-reversing switch means;
    said line pulse-reversing switch means having a control input receiving the output signal of the comparator;

the comparison input of the follow-up control having infed thereto the internal horizontal pulse signal by means of the second input of the line pulse-reversing switch means.

6. The synchronization circuit as defined in claim 5, wherein:

said line pulse-reversing switch means comprises two AND-gates whose outputs are linked together by means of an OR-gate;

an input of one of said AND-gates, constituting a first control input of the line pulse-reversing switch means, receiving a non-inverted output signal of the comparator and an input of the other AND-gate, serving as the second control input of the line pulse-reversing switch means, receiving the inverted output signal of the comparator.

7. The synchronization circuit as defined in claim 1, wherein:

said follow-up control comprises a phase-comparator having an input side and an output side;

said input side of the phase comparator being connected with the output of a first monoflop and with the output of a second monoflop; and the output side of the phase comparator delivering the clock frequency signal by means of a series circuit of an integrator circuit, an oscillator circuit, a high-pass filter and an output-amplifier circuit.

8. The synchronization circuit as defined in claim 7, wherein:

said integrator has an output;

a reference voltage source; and a Zener-diode connecting the output of the integrator with the reference voltage source.

9. The synchronization circuit as defined in claim 1, wherein:

said line pulse-separation circuit comprises a first monoflop having a clock input which is impinged with the mixed pulse signal and delivering an output signal;

a NAND-gate having a first input, a second input and an output;

the output signal of the first monoflop being delivered to the first input of the NAND-gate;

an inverter having an input and an output;

a second monoflop having a clock input;

the output of the NAND-gate being connected with the input of the inverter and with the clock input of the second monoflop;

said second monoflop delivering an inverted output signal to the second input of the NAND-gate; and said inverter delivering at its output the horizontal pulse signal.

10. The synchronization circuit as defined in claim 1, wherein:

said external complete image-characteristic pulse-separation circuit comprises a first monoflop and a second monoflop;

said first monoflop being impinged by a clock input with the mixed pulse signal;

said second monoflop being impinged by a clock input with the output pulse signal of a D-flipflop;

said D-flipflop having infed by means of its D-input the mixed pulse signal and by means of its clock input the inverted output pulse signal of the first monoflop;

said external complete image-characteristic pulse-separation circuit having a NAND-gate;

said NAND-gate having a first input impinged with the horizontal pulse signal and a second input impinged with the output pulse signal of the second monoflop and whose output pulse signal constitutes the external complete image-characteristic pulse.

* * * * *